United States Patent [19]

Harper

[11] 4,082,702
[45] Apr. 4, 1978

[54] FLAME RETARDANT RIGID POLYURETHANE SYNTACTIC FOAM

[75] Inventor: Jack R. Harper, Midland, Mich.

[73] Assignee: Dow Corning Corporation, Midland, Mich.

[21] Appl. No.: 662,384

[22] Filed: Mar. 1, 1976

Related U.S. Application Data

[63] Continuation-in-part of Ser. No. 614,465, Sep. 18, 1975, abandoned.

[51] Int. Cl.$^2$ ............................................. C08G 18/14
[52] U.S. Cl. ......................... 260/2.5 AK; 260/2.5 AJ; 428/308
[58] Field of Search .................. 428/308; 260/2.5 AJ, 260/2.5 AK

[56] References Cited

U.S. PATENT DOCUMENTS

| | | | |
|---|---|---|---|
| 3,046,172 | 7/1962 | Reid | 260/2.5 AK |
| 3,300,421 | 1/1967 | Merriman et al. | 260/2.5 AK |
| 3,382,302 | 5/1968 | Marzocchi | 260/2.5 AK |
| 3,625,872 | 12/1971 | Ashida | 260/2.5 AK |
| 3,900,648 | 8/1975 | Smith | 260/2.5 AK |

FOREIGN PATENT DOCUMENTS

| | | | |
|---|---|---|---|
| 1,086,736 | 10/1967 | United Kingdom | 260/2.5 AJ |
| 1,146,661 | 3/1969 | United Kingdom | 260/2.5 AW |

Primary Examiner—Eugene C. Rzucidlo
Attorney, Agent, or Firm—Roger H. Borrousch

[57] ABSTRACT

A rigid polyurethane syntactic foam obtained by mixing an organic polyol, a polyisocyanate, a catalyst for the reaction of the polyol and polyisocyanate, microballoons and a flame retardant. The flame retardant is a substantially colorless, compatible flame retardant with a viscosity of less than 100 centipoise at 23.9° C., with a volatility such that it does not evaporate from the reaction exotherm and with a reactivity such that it is nonreactive in the mixture to the extent that the physical properties of the foam are not substantially changed compared to the physical properties of a foam without the flame retardant. An example of the flame retardant is tris(2-chloroethyl)phosphate. A combination of the polyol and polyisocyanate are liquid at 25° C. and the amount of microballoons present are sufficient to provide a non-castable mixture in the absence of the flame retardant and the amount of flame retardant is sufficient to provide a castable mixture which will flow in a mold cavity filling the details. The castable mixture can also contain noncombustible flexible fibers, such as glass fibers of less than 25 mm to improve the flexural strength. The mixture cures to a mechanically strong and structural material which is like wood except it is a flame retardant.

15 Claims, No Drawings

FLAME RETARDANT RIGID POLYURETHANE SYNTACTIC FOAM

This is a continuation-in-part of application Ser. No. 614,465, filed Sept. 18, 1975, now abandoned.

BACKGROUND OF THE INVENTION

This invention relates to a flame retardant rigid polyrurethane syntactic foam.

DESCRIPTION OF THE PRIOR ART

Compositions which contain hollow beads, bubbles or microballoons have been known for many years. The concept of using these hollow beads in a composition is designed to reduce the density and also reduce the high cost of the matrix material. It was observed, however, that a reduction in density also resulted in a reduction of the structural strength of the product and it was difficult to obtain maximum strength with a minimum density. Bozzacco et al. in U.S. Pat. No. 2,806,509 described one method for improving the strength at lower densities. Bozzacco et al. coated thin walled hollow beads with a metal powder and a thermosetting resin and then heated these coated beads to tackify the resin and compressed this material to provide a laminate. Although such an approach may provide useful laminates, the procedure involved several steps and does require pressure and heating to make the laminates. Reid in U.S. Pat. No. 3,046,172 describes dispersing friable hollow spherical bodies, such as clay spheres, in a liquid mixture to provide a moldable composition which makes spongy elastomeric material by crushing the product to reduce the number of hollow spheres. The liquid mixture of elastomeric precursor and hollow spheres can be obtained by using organic solvent solutions of the elastomer, organic liquid dispersions of the elastomer, aqueous dispersions of the elastomer or a mixture of substances capable of reacting to form an elastomeric material. Reid describes, as one of the mixtures capable of reacting to form an elastomer, polyurethane elastomer produced by a mixture containing polyisocyanate and a polyhydroxy compound. Reid describes using a plasticizer in substantial quantities for the precursor of polyurethane elastomer even though the precursor is a liquid. This is known to be necessary because the quantities of hollow spherical bodies used in making the compostion of Reid would render the composition nonflowable and could not be molded in the manner Reid desires. The use of a plasticizer or solvent to reduce the viscosity will necessarily alter the final properties of the cured product compared to those compositions without such plasticizers or solvent. Also such plasticizers or solvents would complicate the processing of the composition and enhance the flammability of the final product.

Kohrn in U.S. Pat. No. 3,238,156 describes an elastomer containing dispersed throughout microballoons. Kohrn found that microballoons of resinous materials can be dispersed throughout an elastomer without effecting the rebound and are crushed when molded with the elastomer into spherical platelets instead of a powder as described by Reid in U.S. Pat. No. 3,046,172. Kohrn also found that for polyurethane elastomer, as a fluid pre-polymer, these microballoons were readily received by the pre-polymer, at relatively low temperatures without the need for the steps of putting the elastomer into a solution or suspension prior to the introduction of the microballoons and subsequently removing the solvent or suspending medium from the mixture. Kohrn, however, molds the material and ends up with a product which has no substantial change in density compared to a product without the microballoons because the microballoons crush into spherical platelets on molding. Kohrn's resin microballoons, specifically described, are made from urea-formaldehyde resin or phenol-formaldehyde resin. Kohrn, for comparison, prepared liquid polyurethane elastomer with Micro-cel, porous calcium silicate particles under one micron in diameter and with Eccospheres which are hollow glass balloons of 30 to 125 microns in diameter. Both the Micro-cel and Eccospheres had inferior properties. Kohrn also does not describe the nature of the mixtures of the liquid polyurethane elastomer with either Micro-cel or Eccospheres, particularly with respect to whether they were fluid, paste or crumb.

Newnham et al. in U.S. Pat. No. 3,251,916 describe, however, that tacky crumbs are obtained when liquid polyurethane reactants are mixed with expanded polystyrene beads. The crumb material is gently shaped and allowed to harden to provide a substantially rigid cellular product. It is apparent that the material, from which the bead or microballoon is made, had a great effect upon the characteristics of the resulting mixture of liquid polyurethane reactants, in view of, the differences betwen the urea-formaldehyde resin microballoons of Kohrn which are described as flowable mixtures and the expanded polystyrene beads of Newnham et al. which are described as a crumb.

Merriman et al. in U.S. Pat. No. 3,300,421 describe particles of rigid expanded material dispersed in a cellular mass of resilient organic polymer, such as resilient polyurethane. This reference shows a mixture, which is poured in a paper-bag mold where it foamed up and gelled, containing urea-formaldehyde resin microballoons. A mixture of slightly tacky but loose material prepared from a liquid bonding agent (polyurethane reactants), crumbed scrap resilient polyurethane foam and expanded polystyrene beads is also described. Merriman et al. state that the polyurethane foam may be obtained as known in the art together with the auxiliary ingredients familiar to those in the art, including catalysts, activators, cross-linking ingredients, foam-stabilizing agents, auxiliary inflating agents, fibrous fillers, ground scrap resilient cellular material, flame retardants, antioxidants and colouring agents, either by a single-stage process or by way of a prepolymer.

Pitchforth et al. in U.S. Pat. No. 3,472,798 teaches that hollow microspheres in polyglycol-based polyurethane elastomers separate very rapidly and that they have found that polymethylmethacrylate-neopentane microspheres can be stabilized in suspension of polyglycol by using polyvinylchloride. Pitchforth et al. also teach that the incorporation of the expanded microspheres has little effect on tensile strength, percent elongation and tear strength. Pitchforth et al. suggest a solution to the separation problem for a single type of hollow microspheres in polyurethane precursors. The previously cited references are absent of any suggestion that there was a separation problem, however, it is apparent that there exists a potential separation problem anytime one mixes a low density microballoon in a more dense liquid medium.

D'Eustachio et al. in U.S. Pat. No. 3,510,392 teach that cellular polyurethane can be made by placing the reactants for polyurethane in a mold and then pouring cellular glass modules into the mold to fill the remainder of the mold cavity and next heat the mold to polymerize and foam the polyurethane reactants. The product is a semi-rigid structural unit which has improved flame retarding properties compared to the polyurethane, per se. Although this method would be useful for certain items, it would appear to be difficult to use for intricate structures or shapes of consistant strength and properties and it would take a careful balance of nodules to polyurethane foam.

Jonnes et al. in U.S. Pat. No. 3,524,794 teach a fluid sealing gasket less than about 4 mm. thick comprising an elastomeric binder matrix containing 20 to 80 volume percent hollow rigid collapsible particles dispersed and permanently bonded therein. Jonnes et al. teach using hollow glassy spheroids of 10 to 300 microns which are referred to as microbubbles where the microbubbles are dispersed in the elastomer matrix phase by either dissolving or dispersing the elastomeric material in a volatile diluent. Jonnes et al. prefer the elastomeric material be in the monomeric or liquid polymerizable or curable state before application. One such liquid polymerizable elastomeric material described by Jonnes et al. is obtained by combining the precursors for polyurethane elastomer in a volatile diluent toluene and then adding glass bubbles. A gasket is obtained by depositing this mixture, keeping it at room temperature for 12 hours, heating if for 30 minutes at 95° C. and then for 30 minutes at 150° C. to obtain a gasket layer of about 0.8 mm. thick. Jonnes et al. found it necessary to use a volatile diluent even for the liquid polurethane precursors and as a result required a rather complicated curing procedure to eliminate the diluent from the final product which was a very thin section product and it is apparent that such compositions would be highly impractical for final products which have thickness measured in inches or even one-half inch.

Beck in U.S. Pat. No. 3,585,157 teaches a syntactic foam having three phases, a binder phase, a microcell phase and a macrocell phase. Beck describes using as the binder phase the liquid reactants required to make a polyurethane resin. As the microcell phase, Beck uses glass bubbles and for the macrocells, Beck uses expanded polystyrene spheres. Two types of mixtures are obtained, one which is poured into a mold to cure and others which need to be trowelled into the mold. Although Beck avoided the use of volatile diluents as needed by Jonnes et al., he was unable to pour or cast his compositions over the entire range of ingredients.

Treadwell in U.S. Pat. No. 3,635,821 describes the state of th art for flame retardant polyurethane foams and offers a solution of overcoming the difficulties observed in the art of flame retarding polyurethane foams. Treadwell states that the additives used in the past have a tendency to ignite even for a short period of time and thus increase the possibility of spreading flame and/or initiating flame from heat sources in a building structure. Treadwell relates other difficulties arising from the use of the prior art flame-retardant additives such as they may reduce the mechanical strength and/or stability of the urethane foams. Problems may also arise by the use of certain additives in that the additives are themselves unsatisfactory in that they give the foams moisture-absorbing qualities and reduce the life of the foam. The prior art flame retardants mentioned by Treadwell are antimony trioxide, chlorinated phosphate esters, aluminum flakes and various combinations. Treadwell found that by coating certain inert fillers with a combination of a halogen source such as a chlorinated paraffin and a phosphorus-containing compound such as hydrated calcium phosphate, ammonium phosphate, triphenylphosphine oxide, tricresyl phosphate and halogenated phosphates, several of the difficulties observed by using prior art flame retardants were overcome. Treadwell, however, shows that the inert fillers are pre-treated with the two coating materials before using in a polyurethane foam composition.

Praetzel et al. in U.S. Pat. No. 3,660,321 teach that combustible plastics which contain additives to reduce the flammability have certain disadvantages. For example, the plastics which contain as flameproofing components, organic compounds containing halogen and/or phosphorus, such as chloroparaffins, tetrabromoethane, polychlorodiphenyl, pentabromodiphenyl ether, tris-(2-chloroethyl)phosphate or tris-(2,3-dibromopropyl)-phosphate, becomes flammable again after a period of time because these flame abating compounds are of low molecular weight and are only mechanically admixed with the plastic and migrate from the plastic after a period of time and this migration reduces the content of the flameproofing component in the plastic. Other disadvantages are that many of the organic phosphorus compounds exert a softening effect on the plastic and undesirable side reactions often result and thus additional additives are needed to offset these effects. Praetzel et al. found that if one adds the flame-abating compound encapsulated in microcapsules one avoids the problems encountered above. Although this approach may solve the flame retarding problem, it would not be useful in providing a low density syntactic foam because the microcapsules are filled with the flame-abating compound.

Weber in U.S. Pat. No. 3,826,764 describe another method for making flame resistant self-extinguishing compositions such as polyurethane foams. Weber uses materials which release flame extinguishing gases such as nitrogen gas or carbon dioxide gas at a preselected temperature. Weber also describes encapsulating the flame extinguishing material in capsules.

Prokai et al. in U.S. Pat. No. 3,846,462 teach making flame retardant polyurethane foams which contain certain polysiloxane oxyalkylene block copolymers which are useful in making the flame-retardant foams which incorporate flame retardants of the halogenated organic compounds and phosphorus-containing compounds.

From the prior art, it is well-known to use liquid reactants to make polyurethanes, both foams and solid products. It is also well known that flame retardants, such as tris(2-chloroethyl)phosphate can be used in polyurethanes as a flame retardant. It is also apparent from the prior art that if such a flame retardant material is used there are too many disadvantages associated with this low molecular weight material to be broadly useful in making flame retardant polyurethane foams. It is also known from the prior art to use solvents or diluents for compositions which contain large amounts of microballoons. However, it has not been known heretofore that a rigid polyurethane syntactic foam could be made which is pourable or castable, have a relatively low density, contain a large amount of microballoons, cures to a product which is structurally as strong as wood or stronger, could be cast and cured in thick section and have a flame retardant property which exceeds prior art rigid polyurethanes.

SUMMARY OF THE INVENTION

This invention relates to a flame retardant rigid polyurethane syntactic foam which is made from a mixture of microballoons, an organic polyol, a polyisocyanate, a catalyst and a flame retardant which also acts as a flow promotor. The flame retardant provides the composition with sufficient fluidity to allow it to be cast into molds, flow into crevices to duplicate mold detail and provides composition which when cured will be flame retardant and structurally strong. The flexural strength can be improved by adding to the mixture noncombustible flexible fibers, such as glass fibers. The composition cures in large molds and will provide a cured product which can be substituted for wood with the added advantage that it is flame retardant.

It is therefore an object of this invention to provide a flame retardant syntactic foam which can be cast in a mold and cures to a product which is a substitute for wood and is also flame retardant. These and other objects will become more apparent in the following detailed discussion.

DESCRIPTION OF THE INVENTION

This invention relates to a rigid polyurethane syntactic foam consisting of a cured product obtained from a mixture consisting essentially of the compostion obtained by mixing an organic polyol, a polyisocyanate, microballoons, a catalyst for the reaction between the organic polyol and polyisocyanate, and a substantially colorless, compatible flame retardant having a viscosity less than 100 centipoise at 23.9° C., having a volatility such that the flame retardant does not evaporate from the exotherm generated by reacting ingredients and said flame retardant is non-reactive in the mixture to the extent that the physical properties of the foam are not substantially changed compared to the physical properties of the foam without the flame retardant present, a combination of the organic polyol and the polyisocyanate being a liquid at 25° C., there being present in the mixture a sufficient amount of microballoons to provide a non-castable mixture in the absence of the flame retardant and the amount of flame retardant present in the mixture being sufficient to provide a castable mixture which will flow in a mold cavity to the extent that mold details are filled, and the mixture cures to a rigid polyurethane syntactic foam which is flame retardant.

The organic polyols and polyisocyanates which are liquids at 25° C. are well-known in the prior art as is evident from the patents cited hereinbefore. The specific polyols or isocyanates are not critical except that a combination of the two are liquid at 25° C. The organic polyol can be either of the polyether type or the polyester type. It is also within the scope of this invention to use some prereacted combinations of organic polyol and polyisocyanate. The organic polyol and polyisocyanate, however, are those combinations of organic polyol and polyisocyanate which give rigid polyurethane.

The microballoons can be made from any material known in the art, but are preferably made from glass which provides the optimum physical properties for strength. The particle size of the microballoons are those ordinarily found in the prior art.

The catalysts are those conventionally used to cure polyurethanes, especially those which catalyze the reaction between organic polyols and polyisocyanate, such as amines and tin catalyst.

The flame retardants suitable for the rigid polyurethane syntactic foams of this invention are those which have a viscosity of less than 100 centipoise at 23.9° C. Flame retardants which are solids or have viscosities greater than 100 centipoise at 23.9° C. do not provide all the properties of the mixture as well as of the cured foam, however, small amounts of these other flame retardants can be used with the low viscosity flame retardants for some additional benefits but their amounts should not interfere with the overall property profile of the mixture or cured foam. The flame retardant should also be compatible with the polyurethane reactants and with the cured foam to the extent that it does not exude from the cured foam or separate from the mixture. The volatility of the flame retardant must be sufficiently high so that it does not evaporate from the mixture during the exotherm generated by the reacting ingredients. The flame retardant should also be non-reactive in the mixture to the extent that the physical properties of the cured syntactic foam are not substantially changed compared to the physical properties of the cured syntactic foam without the flame retardant present. The preferred flame retardant is tris(betachoroethyl)phosphate.

A foam with a combination of properties of low density, strength, fluidity and flame retardancy result from using liquid organic polyol and polyisocyanate combinations and using a sufficient amount of microballoons to make the resulting mixture non-castable, non-flowing and then using enough flame retardant as described above to make the mixture castable to the extent that it will flow in a mold cavity such that the mold details are filled. By using these amounts, the resulting cured rigid polyurethane syntactic foam is strong, low in density and flame retardant. The amounts of each ingredient will depend upon the particular organic polyol, polyisocyanate and microballoon used. These ingredients vary broadly in characteristics and thus the amount of each will vary likewise. The relative amounts of organic polyol and polyisocyanate are used in the stoichiometric amounts of the prior art.

The mixture can also contain noncombustible flexible fibers which are less than 25 mm in length. These noncombustible flexible fibers improve the flexural strength of the rigid polyurethane syntactic foam. A preferred noncombustible flexible fiber is glass fiber. These noncombustible flexible fibers can be a single monofilament or fiber or milti-filament which are herein referred to as bundles. The fibers can be chopped into the desired lengths from longer strands. Preferably, the fibers are about 6 mm in length. These noncombustible fibers improve the flexural strength of the rigid polyurethane syntactic foam without disturbing the flame retardant properties or the casting properties of the mixture.

The amount of noncombustible flexible fiber will vary in accordance with the particular mixing and molding equipment available. The amount should not be such, that it reduces the fluidity of the mixture to a point where the mixture is no longer suitable for casting into a mold. Amounts of from 5 to 15 weight percent based on the total weight of the mixture have been found suitable to increase the flexural strength without reducing the ability of the mixture to be cast into a mold.

The ingredients are combined in the manner usually used in the prior art in that the polyisocyanate is usually added last. Any other method of combining the ingredients is applicable as long as the final mixtur can be cast into a mold. Once all the ingredients are conbined, the mixture will cure at room temperature to a rigid polyurethane syntactic foam.

The syntactic foams of this invention are suitable for structural purposes, such as a replacement for wood and have the added advantage of being flame retardant.

The following examples are presented for illustrative purposes only and should not be construed as limiting the invention which is properly delineated in the claims.

EXAMPLE 1

A mixture of 6 parts by weight of an organic polyol, Voranol RS-350, a sucrose base polyether polyol, sold by The Dow Chemical Company, Midland, Michigan, 6 parts by weight of polymethylene polyphenyldiisocyanate, 6 parts by weight of tris(betachloroethyl)phosphate, 2.5 parts of glass microballoons and 0.1 part by weight of a mixture of 1 part by weight of triethylene diamine and 2 parts by weight of dipropylene glycol was prepared. The above mixture was prepared by adding the isocyanate ingredient last. The resulting mixture was fluid and could readily be cast into a mold and when cured to a rigid polyurethane syntactic foam, was non-burning. A mixture was prepared as described above except the tris(betachloroethyl)phosphate was left out. This mixture was a wet powder, was not castable and when cured, burned. This material had a limiting oxygen index (LOI) of 17% oxygen whereas the mixture containing the tris(betachloroethyl)-phosphate had an LOI of 80% oxygen.

EXAMPLE 2

A mixture of 100 parts by weight of organic polyol, Voranol RS-350, 42 parts by weight glass microballoons, 75 parts by weight of tris(betachloroethyl)phosphate, 1 part by weight of the catalyst mixture of Example 1, and 100 parts by weight of polymethylene polyphenyl diisocyanate was prepared by adding the isocyanate ingredient last. The mixture was castable and cured at room temperature to a rigid polyurethane syntactic foam which did not burn, in that no burning occured after the flame was removed.

EXAMPLE 3

(A) A mixture of 100 parts by weight of an organic polyol, Voranol 370, a high functionality sucrose base polyether polyol, sold by the Dow Chemical Company, Midland Michigan, 75 parts by weight of tris(betachloroethyl)phosphate, 35 parts by weight of glass microballoons, 1.5 parts by weight of a silicone surfactant and 1.0 part by weight of a mixture of one part by weight triethylene diamine and two parts by weight dipropylene glycol was prepared. To this mixture, 100 parts by weight polymethylene polyphenyldiisocyanate was added and the mixture was allowed to cure in a test sample.

(B) A mixture was prepared as described in (A) above except 5 parts by weight of chopped glass fiber strands of about 6 mm in length were present in the mixture. (C) A mixture was prepared as described in (A) above except 10 parts by weight of chopped glass fiber strands of about 6 mm in length were present in the mixture.

The flexural strength was determined on each cured sample of (A), (B) and (C) in accordance with the procedure ASTM-D-790 with the results as shown in the Table below in kilopascals (kPa).

Table

| Composition | Flexural Strength, kPa |
|---|---|
| (A) | 6674 |
| (B) | 7584 |
| (C) | 9067 |

That which is claimed is:

1. A rigid polyurethane syntactic foam consisting of a cured product obtained from a mixture consisting essentially of the composition obtained by mixing an organic polyol, a polyisocyanate, microballoons, a catalyst for the reaction between the organic polyol and polyisocyanate, and a substantially colorless, compatible flame retardant having a viscosity less than 100 centipoise at 23.9° C., having a volatility such that the flame retardant does not evaporate from the exotherm generated by reacting ingredients and said flame retardant is non-reactive in the mixture to the extent that the physical properties of the foam are not substantially changed compared to the physical properties of the foam without the flame retardant present, a combination of the organic polyol and the polyisocyanate being a liquid at 25° C., there being present in the mixture a sufficient amount of microballoons to provide a non-castable mixture in the absence of the flame retardant and the amount of flame retardant present in the mixture being sufficient to provide a castable mixture which will flow in a mold cavity to the extent that mold details are filled, and the mixture cures to a rigid polyurethane syntactic foam which is flame retardant.

2. The rigid polyurethane syntactic foam according to claim 1 in which the flame retardant of the mixture is tris(betachloroethyl)phosphate.

3. The rigid polyurethane syntactic foam according to claim 2 in which the microballoons are glass microballoons.

4. The rigid polyurethane syntactic foam according to claim 1 in which the mixture additionally contains noncombustible flexible fibers of less than 25 mm in length.

5. the rigid polyurethane syntactic foam according to claim 4 in which the noncombustible flexible fibers are glass fibers.

6. The rigid polyurethane syntactic foam according to claim 5 in which the glass fibers are about 6 mm in length.

7. The rigid polyurethane syntactic foam according to claim 6 in which the glass fibers are present in amounts of from 5 to 15 weight percent based on the total weight of the mixture.

8. The rigid polyurethane syntactic foam according to claim 4 in which the flame retardant of the mixture is tris(betachloroethyl)phosphate.

9. The rigid polyurethane syntactic foam according to claim 6 in which the flame retardant of the mixture is tris(betachloroethyl)phosphate.

10. The rigid polyurethane syntactic foam according to claim 7 in which the flame retardant of the mixture is tris(betachloroethyl)phosphate.

11. The rigid polyurethane syntactic foam according to claim 8 in which the microballoons are glass microballoons.

12. The rigid polyurethane syntactic foam according to claim 9 in which the microballoons are glass microballoons.

13. The rigid polyurethane syntactic foam according to claim 10 in which the microballoons are glass microballoons.

14. The rigid polyurethane syntactic foam according to claim 13 in which the glass fibers are in the form of glass fiber bundles.

15. The rigid polyurethane syntactic foam according to claim 3 in which the organic polyol is a sucrose base polyether polyol.

* * * * *

UNITED STATES PATENT AND TRADEMARK OFFICE
CERTIFICATE OF CORRECTION

PATENT NO. : 4,082,702

DATED : April 4, 1978

INVENTOR(S) : Jack R. Harper

It is certified that error appears in the above-identified patent and that said Letters Patent are hereby corrected as shown below:

In Column 1, lines 47 and 48, "compostion" should read ---composition---.

In Column 3, line 51, the phrase "of th art" should read ---of the art---.

In Column 5, line 27, "compostion" should read ---composition---.

In Column 6, lines 23 and 24, "tris(betachoroethyl)phosphate." should read ---tris(betachloroethyl)phosphate.---.

In Column 6, line 69, the phrase "final mixtur can" should read ---final mixture can---.

In Column 7, line 1, "conbined" should read ---combined---.

Signed and Sealed this

Eighteenth Day of August

[SEAL]

Attest:

GERALD J. MOSSINGHOFF

Attesting Officer

Commissioner of Patents and Trademarks